United States Patent [19]

Dreier

[11] Patent Number: 4,766,330
[45] Date of Patent: Aug. 23, 1988

[54] SWITCHING EQUIPMENT FOR NUMERICAL CONTROLLED MACHINE TOOLS

[75] Inventor: Horst E. Dreier, Horb, Fed. Rep. of Germany

[73] Assignee: Laserlux AG, Luxembourg, Luxembourg

[21] Appl. No.: 866,113

[22] Filed: May 22, 1986

[30] Foreign Application Priority Data

May 22, 1985 [DE] Fed. Rep. of Germany ....... 3518300

[51] Int. Cl.⁴ .......................... H01H 7/00; H01S 3/04
[52] U.S. Cl. ...................................... 307/139; 307/140; 307/114; 307/115; 372/35
[58] Field of Search ............... 307/115, 116, 117, 118, 307/119, 139, 140, 114, 112, 132 R, 132 E, 38, 34, 41, 35, 39; 73/1 E, 800; 324/305, 308, 309, 311, 317; 372/9, 10, 11, 34, 35, 71, 75; 33/1 R, 1 A, 1 N, 534, 547; 328/75, 69, 70, 83, 97; 219/121 EZ, 121 FS

[56] References Cited

U.S. PATENT DOCUMENTS

| | | | |
|---|---|---|---|
| 3,416,001 | 12/1968 | Fistell | 307/120 |
| 3,517,217 | 6/1970 | Sleater et al. | 307/241 X |
| 3,555,449 | 1/1971 | Osial et al. | 372/35 |
| 3,670,175 | 6/1972 | Petersen et al. | 307/140 X |
| 3,700,972 | 10/1972 | Bates | 307/114 X |
| 3,784,840 | 1/1974 | Kirkpatrick | 307/248 X |
| 3,814,949 | 6/1974 | Weinberg | 307/141 |
| 3,886,376 | 5/1975 | Asija | 307/116 |
| 4,054,802 | 10/1977 | Mock | 307/38 |
| 4,292,546 | 9/1981 | Clark | 307/114 |
| 4,323,787 | 4/1982 | Sato et al. | 307/115 X |
| 4,367,510 | 1/1983 | Watanabe | 307/114 X |
| 4,380,809 | 4/1983 | Sato | 307/38 X |
| 4,437,018 | 3/1984 | Manley | 307/140 X |
| 4,445,217 | 4/1984 | Acharekar et al. | 372/35 |
| 4,480,197 | 10/1984 | Hollaway | 307/140 X |
| 4,507,789 | 3/1985 | Daly et al. | 372/35 X |
| 4,644,550 | 2/1987 | Csery et al. | 372/35 X |

Primary Examiner—William M. Shoop, Jr.
Assistant Examiner—Paul Ip
Attorney, Agent, or Firm—Bachman & LaPointe

[57] ABSTRACT

Switching equipment for numerically controlled machine tools is provided with at least one controllable switch for initiating a measuring process and a switch control which closes the switch when a supply voltage appears on a connecting wire, for example on a power supply connecting wire of an electric pump for cooling water. Therefore it is possible to measure automatically without any additional program-steps of the central processing unit.

4 Claims, 3 Drawing Sheets

SWITCHING EQUIPMENT FOR NUMERICAL CONTROLLED MACHINE TOOLS

BACKGROUND OF THE INVENTION

The present invention relates to a switching equipment for numerical controlled machine tools comprising at least one controllable switch for activating measuring equipment.

For machine tools controlled by a central processing unit it is necessary to move the tools or the work pieces in exact positions. For this purpose laser position measuring equipment is used, the measuring signals of which in a certain position are forwarded to a central processing unit. In known equipment, the measuring results are transmitted to the measuring equipment in definite positions by manually pressing a key. The monotonous process of work needs considerable personnel expenditure and causes time delays in transmitting the measuring results.

SUMMARY OF THE INVENTION

It is an object of the present invention to create switching equipment for numerical controlled machine tools, which as a connection between a machine tool and measuring equipment enables one to get an automatic transfer of measuring values without the need for special control orders by the processing unit.

This and other objects of the invention are attained by switching equipment for numerical controlled machine tools, comprising at least one controllable switch for activating measuring equipment; and a switch control having an input connected to a connecting wire of an electric device so that when a particular supply voltage appears on the connecting wire the switch control closes the controllable switch to cause the start of a measuring process or a measuring transfer. The switching equipment has an electrically controllable switch, which is operated by a switch control in dependance on a definite providing voltage. For this purpose the switch control for example can be connected at its inputs to the power supply wire of a pump for cooling water of a machine tool, so that by switching on the cooling water pump the supply voltage of the cooling pump appears on the input of the switching control. The switching control then causes at least one switch to be operated, whereby the measuring equipment connected to the switch begins transmitting the measuring values for the processing thereof.

There can be measuring equipment for measuring the turn-angle and length associated with the controllable switch, so that it is possible to state the exact positioning of a work piece to be tooled. Closing the controllable switch a processor for example can receive information from a laser measuring equipment and an angle measuring equipment referring to the present measuring values at the moment and effect consequently, if necessary, a correction of position. According to the measuring equipment, several controllable switches can be provided for the different kinds of measuring values. One such switch for example can be connected to an input of the processor and another switch can be provided for the operation of the angle measuring equipment. The switch control can keep the switches closed for a predetermined time if a supply voltage occurs.

Another embodiment of the invention provides that the switch control has an alternating current input and a direct current input.

In case the switching equipment is firmly integrated in the switch cabinet of a machine tool equipment the input will be adjusted in preferance especially the supply voltage to which the switch control is connected.

DETAILED DESCRIPTION OF THE PREFERRED EMBODIMENTS

Figure 1:
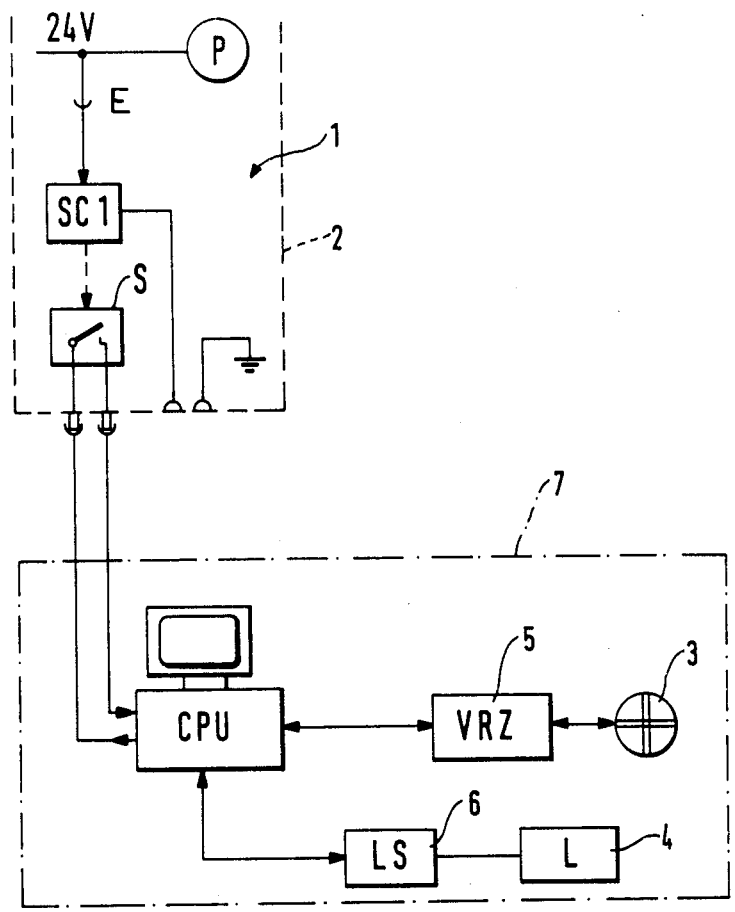
FIG. 1 is switching equipment to which measuring equipment is added.

The switching equipment 1 shown in FIG. 1 is integrated in a switch cabinet 2 of machine tool equipment and consists of a switch control SC1 and a controllable switch S. The input E of the switch control SC1 here is connected to the supply wire of a cooling pump P, which in operation has a voltage of 24 Volts DC. In case this voltage appears on said wire, the switch control SC1 effects the closing of switch S, whereby a processor CPU is caused to overtake the measuring values of an angle measuring equipment 3 and a laser measuring equipment 4. The processor CPU then processes the measured values for controlling the machine tool. For this purpose a counting device, counter 5, is arranged between the processor CPU and the angle measuring equipment 3 to store temporarily the measured values supplied by the angle measuring equipment 3.

For control of the laser-measuring equipment 4, a laser control 6 is provided which is arranged between the processor CPU and the laser measuring equipment 4. The processor CPU and the equipment 5, 3, 6, and 4 form the measuring equipment 7 which is operated by the switch S in case the supply voltage of 24 Volts appears.

Figure 2:
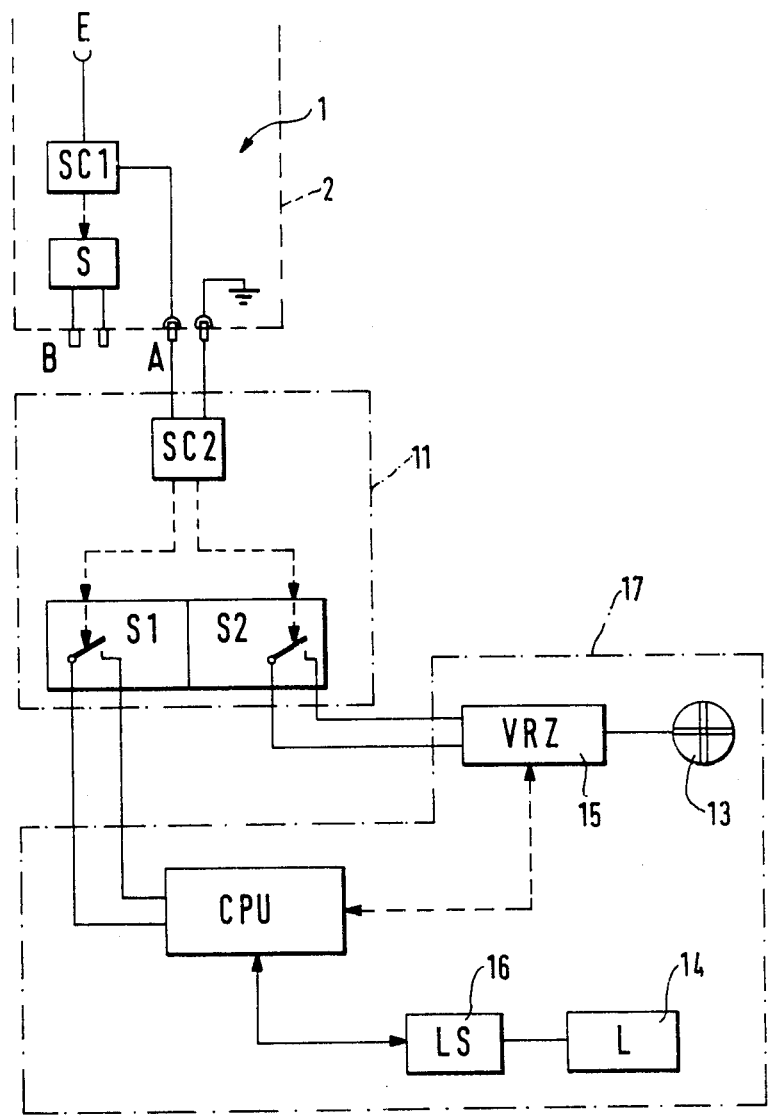
FIG. 2 shows internal and external switching equipment, to which measuring equipment is annexed.

In FIG. 2 the adjoined plugs B of switch S are free, whereas the sockets A are connected to external switching equipment 11. The switching equipment 11 consists of a switch control SC2 and two switches S1, S2.

One of the sockets A of the switching equipment 1 is grounded, while the other socket is directly or via a resistor (R2, FIG. 4) connected with the input E. The switch control SC1 is shown in FIG. 4. The switch control SC2 is shown in FIG. 3.

The measuring equipment 17 shown in FIG. 2 comprises a central processing unit CPU and a counter 15, measuring equipment 13 to measure angle degrees, a laser control 16 and laser measuring equipment 14. The counter 15 is directly connected to the switch S2. When switch S2 is closed, the counter 15 takes the measured value from the measuring means 13 and transfers this value to the CPU. This procedure is started by switch S2 when it closes. The measuring system, shown in FIG. 1 starts this procedure by the CPU.

Figure 3:
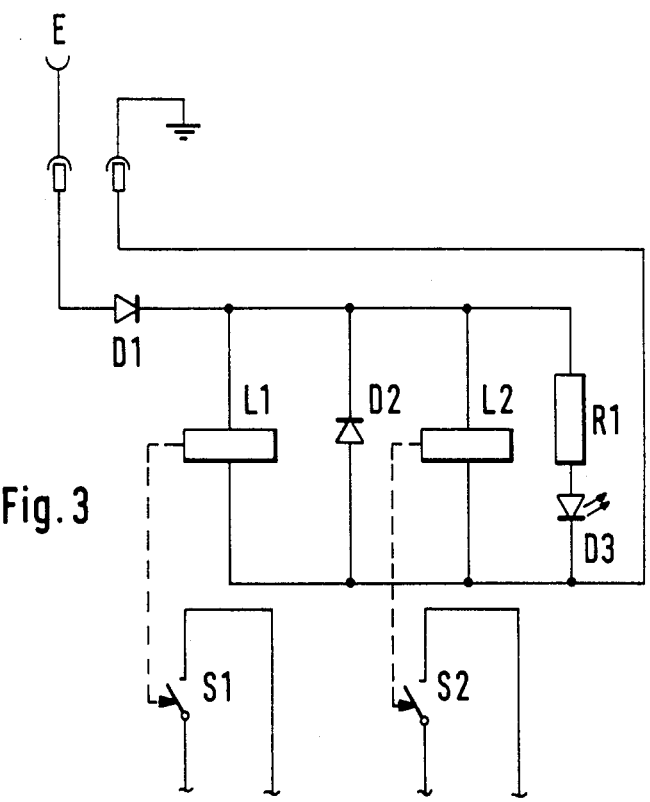
FIG. 3 shows the circuit of the external switching equipment of FIG. 2.
Figure 4:
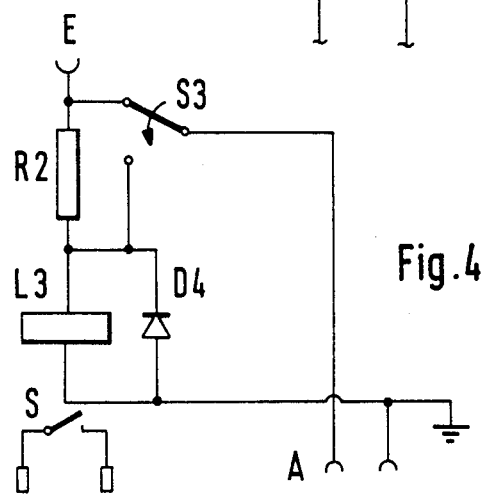
FIG. 4 shows the circuit of the internal switching equipment of FIG. 1.

FIG. 3 shows a circuit with a diode D1, which is connected to input E. The cathode of the diode D1 is connected to the magnetic coils L1, L2 of two relays. The switches S1, S2 are part of these relays and are forced by the magnetic coils L1, L2. A light emitting diode D3 shows the switched-on-status, which is connected to the diode D1 via a resistor R1. The diode D1 and the diode D2 are provided to protect the other devices against high voltages.

FIG. 4 shows the circuit of the switching equipment 1 (FIG. 1, FIG. 2) in detail. The input E is connected via resistor R2 to a magnetic coil L3 of a relay, which forces the switch S. The coil L3 is shunted by a protecting diode D4. Furthermore a switch S3 is provided to connect the socket A directly to the input E or via resistor R2.

What is claimed is:

1. Switching equipment for numerically controlled machine tools comprising at least one controllable switch for activating measuring equipment, a switch control connected to said at least one switch, said switch control having an input connected to a power supply connecting wire of a pump for providing cooling water, whereby said switch control closes said at least one switch when a supply voltage having a particular magnitude appears on said wire to initiate at least one of a measuring process and a measuring transfer, said at least one controllable switch being closed only for a predetermined time interval by said switch control.

2. The switching equipment as defined in claim 1 further comprising several controllable switches which are simultaneously operable by said switch control.

3. The switching equipment as defined in claim 1 wherein the switch control has an input for alternating current and an input for direct current.

4. The switching equipment as defined in claim 1 wherein the switching equipment is located in a switch cabinet of a machine tool and is connected to the measuring equipment by a connector socket.

* * * * *